Feb. 5, 1924.  1,482,914
J. J. DAIGLE
CAN OPENER
Filed March 14, 1922
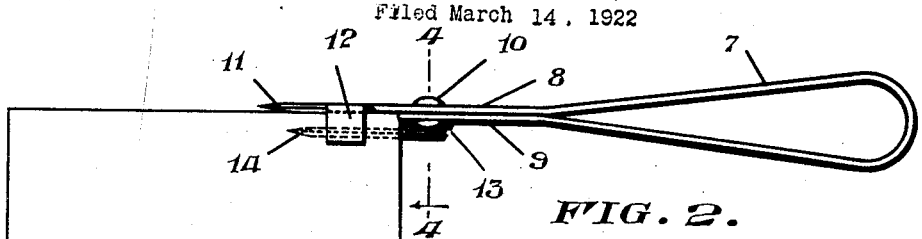
FIG. 2.
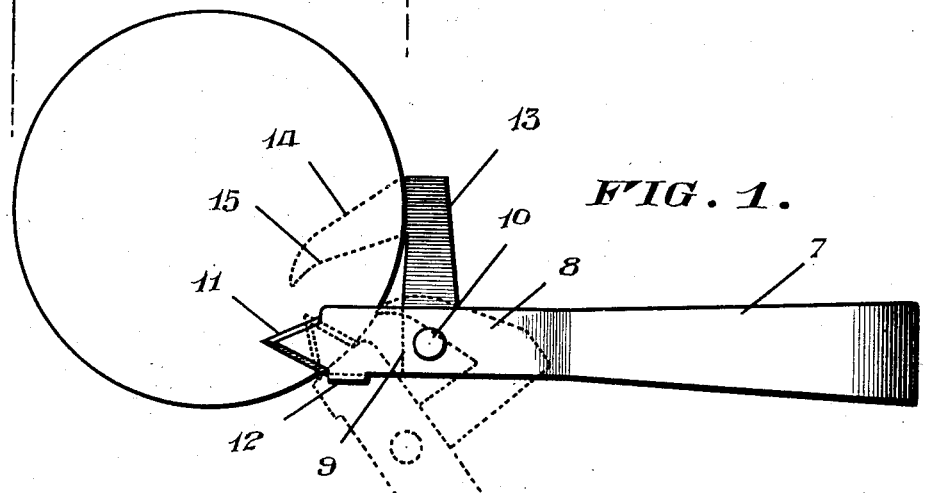
FIG. 1.
FIG. 3.
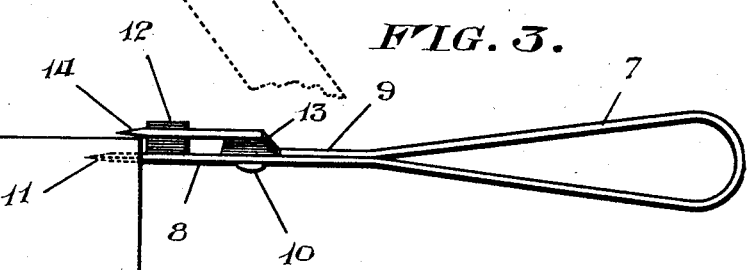
FIG. 4.
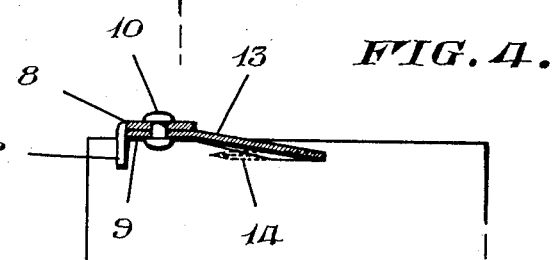
Inventor:
J. J. DAIGLE,
By W. J. Fitz Gerald & Co.
Attorney.

Patented Feb. 5, 1924.

1,482,914

UNITED STATES PATENT OFFICE.

JOSEPH J. DAIGLE, OF ROBERTVILLE, NEW BRUNSWICK, CANADA.

CAN OPENER.

Application filed March 14, 1922. Serial No. 543,795.

*To all whom it may concern:*

Be it known that I, JOSEPH J. DAIGLE, a citizen of the Dominion of Canada, residing at Robertville, in the county of Gloucester, New Brunswick, Canada, have invented certain new and useful Improvements in Can Openers; and I do hereby declare the following to be a full, clear, and exact description of the invention, such as will enable others skilled in the art to which it appertains to make and use the same.

The present invention relates to can openers, and aims to provide a novel and improved device of that kind which is con15 venient, practical and efficient in use.

Another object is the provision of such an implement having novel features for efficiently cutting the wall of a can adjacent to one end thereof.

A further object is the provision of a can opener having a cutter blade and fulcrum arranged in a novel manner for cutting the can by the oscillatory movement of the handle, and the implement including a piercing or spear blade for puncturing the can for the insertion of the cutter blade in starting the cutting action.

With the foregoing and other objects in view, which will be understood as the de30 scription proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a plan view of the can opener in position on a can, showing the opener in full lines in starting position and in dotted lines as when completing a cut.

Fig. 2 is an edge elevation of the implement as seen in full lines in Fig. 1.

Fig. 3 is an edge elevation of the imple45 ment showing the same with the piercing or spear blade entering the can to puncture the can for the entrance of the cutter blade.

Fig. 4 is a section on the line 4—4 of Fig. 2.

The handle 7 of the implement comprises a strip of sheet metal doubled upon itself in the form of a loop, with the end portions 8 and 9 bearing together and secured against one another by means of a rivet 10 en55 gaging therethrough. The end portion or shank 8 projects beyond the end portion or terminal 9, and said portion 8 has a terminal prong 11 with a sharp point and diverging cutting edges, to provide a piercing or spear blade for puncturing the can. The portion 8 is provided at one longitudinal side edge with an ear or lug 12 extending at an angle therefrom adjacent to the blade or prong 11 and forming a fulcrum. An arm 13 extends from the longitudinal side edge of the end portion 9 opposite to the fulcrum ear or lug 12, laterally and at right angles with the handle, and a cutting blade 14 projects from the end portion of the arm 13, and is in the form of a bill or beak with a cutting edge 15 projecting toward the ear 12 and arranged at an angle with said ear and longitudinal axis of the handle. The blade 14 is offset from the plane of the portions 8 and 9 toward the side toward which the ear or lug 12 projects, so that when the portion 8 and piercing blade 11 overlap the end of a can, as seen in Figs. 1 and 2, the outer end of the lug or ear 12 can abut the wall or side of the can to form a fulcrum, with the blade 14 entering the wall of side of the can below and adjacent to the end thereof. When the implement is thus applied, as seen in full lines in Fig. 1, and the handle 7 is swung to the dotted line position, the implement is swung about the outer end of the ear or lug 12 as a fulcrum, thereby drawing the blade 14 outwardly and cutting the wall or side of the can for a distance. The implement is then again positioned by moving the blade 14 into the can and advancing the fulcrum lug or ear 12. Thus, by oscillating the implement and advancing it around the can, the end of the can can be cut off.

The piercing blade or prong 11 is used conveniently for puncturing a slit in the can for the first insertion of the blade 14. Thus, as seen in Fig. 3, the implement is turned over, with the blade 14 and lug 12 at the top, whereby the blade 11 can be forced into the wall or side of the can adjacent to the end thereof, the blade 14 passing over the end of the can when the blade 11 enters. The implement can then be turned over to operative position, and the blade 14 inserted through the slit formed, to start the cutting action. The entrance slit which is formed by the blade or prong 11 is preferably adjacent to the seam of the wall, whereby the cut can be started at the seam and terminated adjacent thereto, so as not to require cutting through the seam.

The implement is easily and economically manufactured from a single blank of sheet metal, and is also convenient, practical and efficient in use. The piercing blade or prong 11 provides convenient means for puncturing a hole or slit in the can for the entrance of the blade 14, and said blade or prong 11 also provides a support for the implement during the cutting action, inasmuch as said prong or blade 11 bears on the end of the can during such cutting operation.

Having thus described the invention, what is claimed as new is:—

1. A can opener composed of a single piece of material and comprising a looped handle having one end portion secured on the other, the upper end portion projecting beyond the lower end portion to overlap the top of the can, said projecting portion having a downwardly bent lug to bear against the can, the lower end portion having a rigid arm extending laterally and provided with a cutting blade to enter the can.

2. A can opener composed of a single piece of material and comprising a looped handle having one end portion secured on the other, the upper end portion projecting beyond the lower end portion to overlap the top of the can, said projecting portion having a piercing blade projecting therefrom, said projecting portion having a lug bent down from one edge thereof to bear against the can, and a rigid arm extending laterally from the opposite edge of the lower end portion and provided with a cutting blade to enter the can.

In testimony whereof I have signed my name to this specification in the presence of two subscribing witnesses.

JOSEPH J. DAIGLE.

Witnesses:
 E. W. BREER,
 N. A. LANDRY.